United States Patent
Ahn et al.

(10) Patent No.: US 11,035,451 B1
(45) Date of Patent: Jun. 15, 2021

(54) TORQUE VECTORING APPARATUS

(71) Applicants: Hyundai Motor Company, Seoul (KR); Kia Motors Corporation, Seoul (KR)

(72) Inventors: Chulmin Ahn, Anyang-Si (KR); SungGon Byun, Hwaseong-Si (KR); Seok Joon Kim, Yongin-Si (KR); Su Hyeon Maeng, Seoul (KR); Dong Hui Cheon, Hwaseong-Si (KR); Baekyu Kim, Hwaseong-Si (KR); Junyoung Ha, Anyang-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/836,557

(22) Filed: Mar. 31, 2020

(30) Foreign Application Priority Data

Jan. 8, 2020 (KR) .......................... 10-2020-0002687

(51) Int. Cl.
*F16H 48/36* (2012.01)
*B60W 30/18* (2012.01)
(Continued)

(52) U.S. Cl.
CPC ....... *F16H 48/36* (2013.01); *B60W 30/18009* (2013.01); *B60W 30/18145* (2013.01);
(Continued)

(58) Field of Classification Search
CPC .. F16H 48/36; F16H 37/082; F16H 2048/364; F16H 2702/02; B60Y 2200/91;
(Continued)

(56) References Cited

U.S. PATENT DOCUMENTS

2006/0025273 A1* 2/2006 Gradu ................. F16H 48/36
475/225
2008/0300084 A1* 12/2008 Thompson ............. B62D 11/14
475/150

FOREIGN PATENT DOCUMENTS

WO WO-2019051314 A1 * 3/2019 ........... B60K 17/046

\* cited by examiner

*Primary Examiner* — Roger L Pang
(74) *Attorney, Agent, or Firm* — Morgan, Lewis & Bockius LLP (57) ABSTRACT

A torque vectoring apparatus receiving a vehicle driving torque from a motor-generator may include a speed reduction device engaged to the motor-generator and configured to reduce a rotation speed received from the motor-generator, a differential device engaged to the speed reduction device and configured to receive the speed-reduced torque from the speed reduction device and to differentially output torques to left and right output shafts, a vectoring control motor outputting a control torque, and a torque vectoring apparatus engaged to the vectoring control motor and including two planetary gear sets and controlling a torque ratio output to the left and right output shafts by the control torque of the torque vectoring control motor, wherein the differential device includes a differential case receiving a torque from the speed reduction device, the differential case is mounted between the two planetary gear sets rotatably on a connecting member connecting the two planetary gear sets, and side gears in the differential case are fixedly connected to the two planetary gear sets respectively.

14 Claims, 4 Drawing Sheets

(51) Int. Cl.
*F16H 37/08* (2006.01)
*B60K 17/16* (2006.01)
*B60K 17/04* (2006.01)

(52) U.S. Cl.
CPC .......... *F16H 37/082* (2013.01); *B60K 17/046* (2013.01); *B60K 17/165* (2013.01); *B60Y 2200/91* (2013.01); *B60Y 2200/92* (2013.01); *B60Y 2300/82* (2013.01); *B60Y 2400/804* (2013.01); *F16H 2048/364* (2013.01); *F16H 2702/02* (2013.01)

(58) Field of Classification Search
CPC ......... B60Y 2300/82; B60Y 2400/804; B60W 30/18145; B60K 17/046; B60K 17/165
USPC ........................................ 475/150, 204, 205
See application file for complete search history.

TORQUE VECTORING APPARATUS

CROSS-REFERENCE TO RELATED APPLICATION

The present application claims priority to Korean Patent Application No. 10-2020-0002687 filed on Jan. 8, 2020, the entire contents of which is incorporated herein for all purposes by this reference.

BACKGROUND OF THE INVENTION

Field of the Invention

The present invention relates to a torque vectoring apparatus.

Description of Related Art

In general, a torque vectoring apparatus is a device that can independently control torques transmitted to left-side and right-side drive wheels to improve agility and handing performance of a vehicle.

Here, the term "torque vectoring" refers to controlling the magnitude and the direction of an overall torque applied to a vehicle, of which an example is that a distribution ratio of a driving torque output from an engine and supplied to drive wheels is controlled, facilitating respective driving wheels to receive driving torques controlled by the torque vectoring technology.

Such a torque vectoring may be realized as an additional function of a differential device that receives an engine torque and distributes the engine torque to left-side and right-side drive wheels.

A differential device provided with the torque vectoring function may actively control a torque distribution ratio of left-side and right-side drive wheels to satisfy intention of a driver or to enhance dynamics of a vehicle depending on driving circumstances.

Being assisted by such a differential device having the torque vectoring function, a driver may better utilize the driving torque depending on the driving circumstances and an enhancement of vehicle dynamics may be expected.

Developing a differential device having such a torque vectoring function is not technically obvious, since the torque vectoring function of controlling torques supplied to respective wheels may be additionally employed to the basic function of a differential device.

Development of a torque vectoring apparatus is gathering more spotlight in connection with an electric vehicle since the electric vehicle is better applicable with such a torque vectoring apparatus more precisely in comparison with a traditional internal combustion engine (ICE) vehicle. As environmental vehicles become to have more power and performance, a torque vectoring apparatus is more spotlighted as a technology applicable to a rear differential device of, e.g., an all-wheel drive (AWD) electric vehicles (EV) to improve cornering performance of high performance environmental vehicles.

An exemplary environmental vehicle of the AWD electric vehicle is not necessarily required to have a transfer shaft which is normally required in an ICE vehicle to deliver torque from a frontally mounted internal combustion engine to a rear drive wheels, since AWD function may be achieved by merely employing two-motor system, i.e., front and rear motors.

Regardless of one motor or two motor system or 2wd or AWD system, a torque of an electric motor provided in an electric vehicle is typically more precisely controlled in comparison with an ICE, and thus, a torque vectoring apparatus coupled with such a drive motor may become a very potential tool to provide more agility and more stability to a vehicle.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a torque vectoring apparatus receiving a vehicle driving torque from a motor-generator, including a speed reduction device engaged to the motor-generator and configured to reduce a rotation speed received from the motor-generator, a differential device engaged to the speed reduction device and configured to receive the speed-reduced torque from the speed reduction device and to differentially output split torques to left-side and right-side output shafts, a vectoring control motor outputting a control torque, and a torque vectoring apparatus engaged to the vectoring control motor and including two planetary gear sets and controlling a torque ratio of the split torques output to the left-side and right-side output shafts by a torque received from the torque vectoring control motor. The differential device may include a differential case receiving a torque from the speed reduction device. The differential case may be mounted between the two planetary gear sets rotatably on a connecting member connecting the two planetary gear sets. Side gears at both sides in the differential case may be fixedly connected to the two planetary gear sets respectively.

The exemplary torque vectoring apparatus may further include a torque multiplication device including a first planetary gear set having first, second, and third rotation elements and being mounted on a first one of the left-side and right-side output shafts between the torque vectoring apparatus and the torque vectoring control motor, the second rotation element being engaged to the torque vectoring control motor, the third rotation element being fixedly connected to a transmission housing. The torque multiplication device may be configured to multiply a torque received from the torque vectoring control motor and to output the multiplied torque to the torque vectoring apparatus through the first rotation element.

The first planetary gear set may be a single pinion planetary gear set including a first sun gear, a first planet carrier, and a first ring gear as the first, second, and third rotation elements.

The torque vectoring apparatus may include second and third planetary gear sets. The second planetary gear set may have fourth, fifth, and sixth rotation elements, the fifth rotation element being fixedly connected to a first side gear of the differential device and the first output shaft, the sixth rotation element being fixedly connected to the first rotation element of the torque multiplication device, and The third planetary gear set have seventh, eighth, and ninth rotation elements, the seventh rotation element being fixedly connected to the fourth rotation element through the connecting member penetrating the differential case, the eighth rotation element being fixedly connected to a second side gear and a second one of the left-side and right-side output shafts of the differential device, the ninth rotation element being fixedly connected to the transmission housing.

The second planetary gear set may be a single pinion planetary gear set, and may include a second sun gear, a second planet carrier, and a second ring gear as the fourth, fifth, and sixth rotation elements. The third planetary gear set may be a single pinion planetary gear set, and may include a third sun gear, a third planet carrier, and a third ring gear as the seventh, eighth, and ninth rotation elements.

The differential device may include the differential case mounted between the second planetary gear set and the third planetary gear set rotatably on the connecting member fixedly connecting the fourth rotation element and the seventh rotation element, a plurality of differential gears rotatably mounted on internal surfaces of the differential case, the first side gear and the second side gear mounted at both sides in the differential case, rotatably mounted on the connecting member to be engaged with the plurality of differential gears, and fixedly connected to the fifth rotation element and the eighth rotation element, respectively, and a final gear formed on an external circumference of the differential case and connected to the speed reduction device through a torque transmission member.

The torque vectoring control motor may be connected to an output gear which is connected, through a torque transmission member, to an input gear connected to the second rotation element.

The torque vectoring control motor may be formed as a motor of which a rotation speed and a rotation direction may be controlled.

The speed reduction device may include a drive gear connected to a rotor of the motor-generator through a hub, and an idle gear unit mounted between the drive gear and the differential device to deliver a speed-reduced torque of the motor-generator to the differential device.

The idle gear unit may include an idle shaft mounted external to the differential device and in parallel with an axis of the left-side and right-side output shafts, an idle input gear rotatably mounted on the idle shaft and externally gear-meshed with the drive gear, and an idle output gear fixedly mounted on the idle shaft and engaged to the final gear.

The idle gear unit may further include a synchronizer mounted between the idle input gear and the idle shaft and configure to selectively synchronize the idle input gear and the idle shaft.

An exemplary torque vectoring apparatus is applicable to a high performance environmental vehicle provided with a one-motor e-AWD (all-wheel drive), and may achieve both cornering performance and stability of a vehicle depending on driving conditions.

Furthermore, when a vehicle speed becomes excessive to the motor-generator MG torque transmission from and to the motor-generator MG may be disconnected, reducing undesired power loss and improving fuel consumption.

Such a torque disconnection function may be applicable to a hybrid electric vehicle (HEV), a plug-in hybrid electric vehicle (PHEV), and may be useful in disconnecting torque of a drive motor in the case of running an internal combustion engine.

By symmetrically forming two planetary gear sets in the torque vectoring apparatus, power loss of a torque vectoring apparatus may be minimized and controllability of the torque vectoring apparatus is maximized, since the torque vectoring control motor TVCM may be merely stationary in a straight line.

Fuel consumption loss in driving along a straight line may be minimized, since one ring gear of the two planetary gear sets of the torque vectoring apparatus always acts as a fixed element, and the differential is mounted between the two planetary gear sets. Since a control torque of the torque vectoring control motor TVCM is multiplied by use of a planetary gear set, power loss in driving the torque vectoring control motor TVCM is minimized, improving fuel consumption characteristic.

Other effects which may be obtained or are predicted by an exemplary embodiment will be explicitly or implicitly described in a detailed description of the present invention. That is, various effects that are predicted according to an exemplary embodiment will be described in the following detailed description.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, an exemplary embodiment will be described in detail with reference to the accompanying drawings.

The drawings and description are to be regarded as illustrative in nature and not restrictive, and like reference numerals designate like elements throughout the specification.

In the following description, dividing names of components into first, second and the like is to divide the names because the names of the components are the same as each other and an order thereof is not particularly limited.

Figure 1:
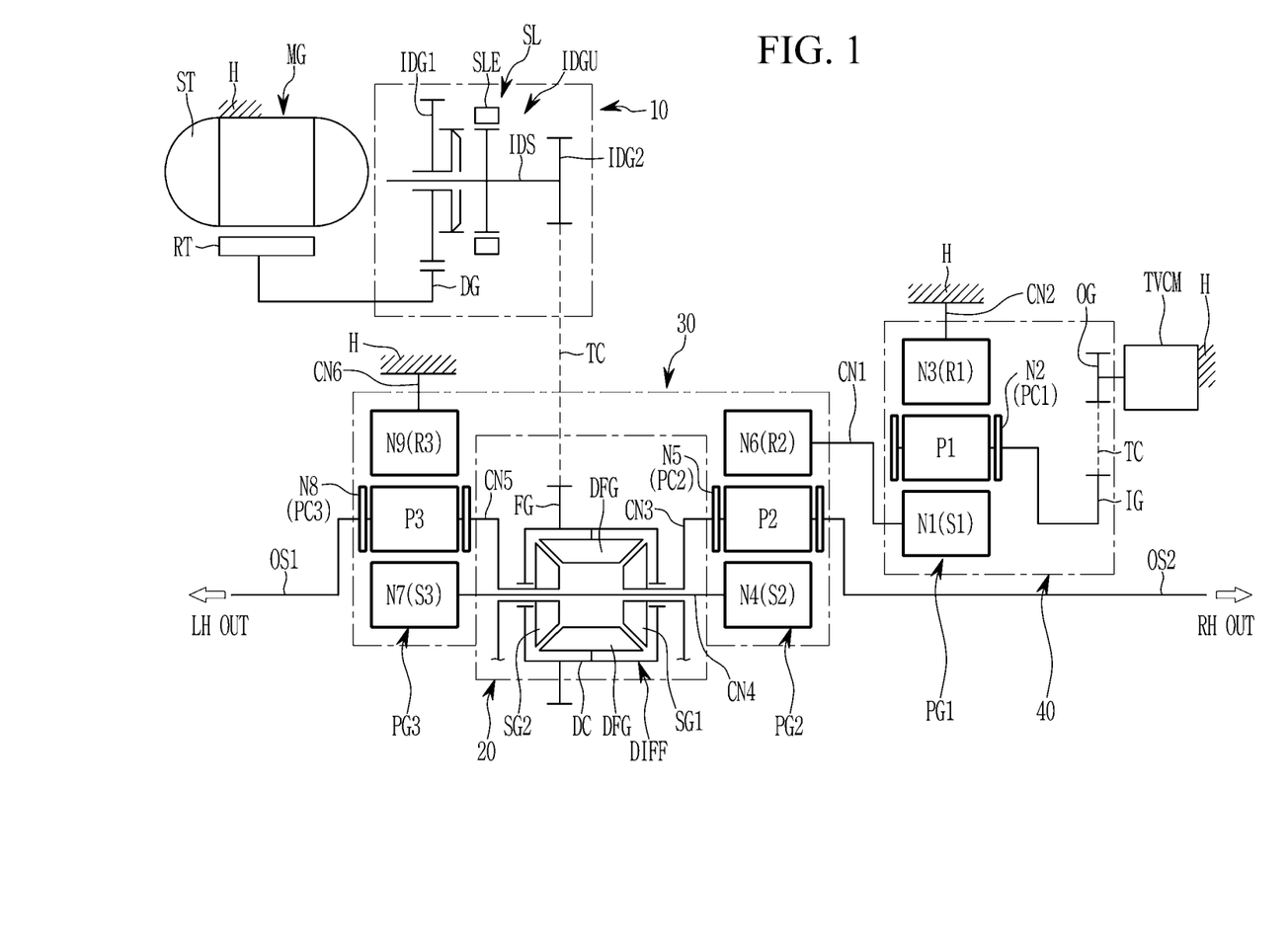
FIG. 1 is a schematic diagram of a torque vectoring apparatus according to an exemplary embodiment of the present invention.

FIG. 1 is a schematic diagram of a torque vectoring apparatus according to an exemplary embodiment of the present invention.

Referring to FIG. 1, a torque vectoring apparatus according to an exemplary embodiment of the present invention includes a motor-generator MG as a driving power source, a speed reduction device 10, a differential device 20, a torque vectoring control motor TVCM, a torque vectoring apparatus 30, and a torque multiplication device 40. The differential device 20, the torque vectoring control motor TVCM, the torque vectoring apparatus 30, and the torque multiplication device 40 are mounted on an axis of left-side and right-side output shafts OS1 and OS2.

In the torque vectoring apparatus, a rotation speed of the motor-generator MG is reduced in the speed reduction device 10, and the reduced speed is transmitted to the differential device 20. The differential device 20 receives a torque from the speed reduction device 10 to and transmits the received torque to left-side and right-side drive wheels while absorbing a speed difference between the left-side and right-side drive wheels.

The torque vectoring apparatus 30 adjusts a torque ratio split to the left-side and right-side drive wheels by use of a torque of the torque vectoring control motor TVCM delivered from the torque multiplication device 40 according to driving conditions such as cornering or driving in a straight line, and thereby improves driving performance such as a cornering performance and the like of a vehicle.

The left-side and right-side output shafts OS1 and OS2 are power transmission shafts provided between the differential device 20 and the left-side and right-side drive wheels, and may imply typical left-side and right-side driveshafts.

The motor-generator MG includes a stator ST fixed to a transmission housing H and a rotor RT connected to the speed reduction device 10. The motor-generator MG acts as a motor supplying rotational power to the speed reduction device 10, and also as a generator generating electricity by the torque applied from the left-side and right-side drive wheels.

The speed reduction device 10 receives a torque from the motor-generator MG, and outputs a torque with a reduced rotation speed (i.e., with an increased torque) to the differential device 20.

The speed reduction device 10 includes a drive gear DG and an idle gear unit IDGU. The torque of the motor-generator MG is input to the speed reduction device 10 through the drive gear DG, and is reduced in a speed at the idle gear unit IDGU. The speed-reduced torque is output from the speed reduction device 10 to the differential device 20.

The drive gear DG is fixedly connected to the rotor RT of the motor-generator MG through a hub 3.

The idle gear unit IDGU reduces the rotation speed through two idle gears provided on an idle shaft IDS.

That is, the idle shaft IDS is mounted radially external to the differential device 20, and mounted in parallel with the left-side and right-side output shafts OS1 and OS2.

Two idle gears of an idle input gear IDG1 and an idle output gear IDG2 are formed on the idle shaft IDS.

The idle input gear IDG1 is rotatably mounted on the idle shaft IDS, and is externally gear-meshed with the drive gear DG.

The idle output gear IDG2 is fixedly mounted on the idle shaft IDS, and is connected to the differential device 20.

The idle gear unit IDGU further includes a synchronizer SL mounted on the idle shaft IDS, to selectively synchronize the idle input gear IDG1 to the idle shaft IDS, to connect or disconnect torque transmission between the motor-generator MG and the differential device 20.

The synchronizer SL is mounted between the idle input gear IDG1 and the idle shaft IDS, and selectively synchronizes the idle input gear IDG1 to the idle shaft IDS.

The synchronizer SL may be formed in a known scheme, which will be obviously understood without a further detailed description, and a sleeve SLE included in the synchronizer SL may be activated by an additional actuator controlled by a control unit.

The torque vectoring control motor TVCM is fixed to the transmission housing H, and is formed as a motor of which a rotation speed and a rotation direction may be controlled. The torque vectoring control motor TVCM is provided with an output gear OG on a motor shaft to output a torque.

The torque vectoring apparatus 30 adjusts a torque ratio between the left-side and right-side drive wheels by use of a torque received from the torque vectoring control motor TVCM, and includes second and third planetary gear sets PG2 and PG3.

The second planetary gear set and the third planetary gear set PG2 and PG3 are mounted apart from each other, interposing the differential device 20.

The second planetary gear set PG2 is a single pinion planetary gear set having fourth, fifth, and sixth rotation elements N4, N5, and N6, and includes the fourth rotation element N4 of a second sun gear S2, the fifth rotation element N5 of a second planet carrier PC2 rotatably supporting a plurality of second pinion gears P2 externally gear-meshed with the second sun gear S2, and the sixth rotation element N6 of a second ring gear R2 internally gear-meshed with the plurality of second pinion gears P2.

The third planetary gear set PG3 is a single pinion planetary gear set having seventh, eighth, and ninth rotation elements N7, N8, and N9, and includes the seventh rotation element N7 of a third sun gear S3, the eighth rotation element N8 of a third planet carrier PC3 rotatably supporting a plurality of third pinion gears P3 externally gear-meshed with the third sun gear S3, and the ninth rotation element N9 of a third ring gear R3 internally gear-meshed with the plurality of third pinion gears P3.

The fourth rotation element N4 is fixedly connected to the seventh rotation element N7 through a fourth connecting member CN4. The fifth rotation element N5 is fixedly connected to the right-side output shaft OS2 through a third connecting member CN3. The sixth rotation element N6 is connected to the torque multiplication device 40 through a first connecting member CN1, receiving the torque of the torque vectoring control motor TVCM.

The eighth rotation element N8 is fixedly connected to the left-side output shaft OS1 through a fifth connecting member CN5. The ninth rotation element N9 is fixedly connected to the transmission housing H through a sixth connecting member CN6, always acting as a fixed element.

The fourth connecting member CN4 fixedly connecting the fourth rotation element N4 and the seventh rotation element N7 may be mounted on an axis of the left-side and right-side output shafts OS1 and OS2. The second planetary gear set and the third planetary gear set PG2 and PG3 may have same gear ratios.

The differential device 20 receives a torque from the speed reduction device 10 to and transmits the received torque to left-side and right-side drive wheels while absorbing a speed difference between the left-side and right-side drive wheels.

The differential device 20 includes a differential case DC receiving a torque from the speed reduction device 10 through a final gear FG, and a differential DIFF mounted between the second planetary gear set and the third planetary gear set PG2 and PG3 of the torque vectoring apparatus 30.

Since the differential case DC is mounted between the second planetary gear set and the third planetary gear set PG2 and PG3, the differential DIFF is rotatably mounted on the third connecting member CN4 that fixedly connects the fourth rotation element N4 and the seventh rotation element N7.

A plurality of differential gears DFG are rotatably mounted in differential case DC. First and second side gears SG1 and SG2 are rotatably mounted on the fourth connecting member CN4 at both sides of the differential case DC, and are engaged with the plurality of differential gears DFG The first side gear SG1 is fixedly connected to the fifth rotation element N5 of the torque vectoring apparatus 30 through the third connecting member CN3, and connected to the right-side output shaft OS2. The second side gear SG2 is fixedly connected to the eighth rotation element N8 of the torque vectoring apparatus 30 through the fifth connecting member CN5, and connected to the left-side output shaft OS1.

The final gear FG is formed on an external circumference of the differential case DC, and connected to the speed reduction device 10 through a torque transmission member TC.

The differential DIFF is rotatably mounted on the fourth connecting member CN4 fixedly connecting the fourth rotation element N4 and the seventh rotation element N7 of the second planetary gear set and the third planetary gear set PG2 and PG3. The first and second side gears SG1 and SG2 within the differential case DC absorb a rotation speed difference between the left-side and right-side drive wheels. Thus, the differential DIFF may transmit a torque to both output shafts OS1 and OS2 through the fifth and eighth rotation elements N5 and N8 of the second planetary gear set and the third planetary gear set PG2 and PG3.

The torque transmission member TC may be formed as a chain or a belt such as a metal belt or a pulley belt.

The torque multiplication device 40 may include a first planetary gear set PG1 mounted on an axis of the right-side output shaft OS2 between the torque vectoring apparatus 30 and the torque vectoring control motor TVCM.

The first planetary gear set PG1 is a single pinion planetary gear set having first, second, and third rotation elements N1, N2, and N3, and includes the first rotation element N1 of a first sun gear S1, the second rotation element N2 of a first planet carrier PC1 rotatably supporting a plurality of first pinion gears P1 externally gear-meshed with the first sun gear S1, and the third rotation element N3 of a first ring gear R1 internally gear-meshed with the plurality of first pinion gears P1.

The first rotation element N1 is fixedly connected to the sixth rotation element N6 of the torque vectoring apparatus 30 through first connecting member CN1. The second rotation element N2 is connected to the torque vectoring control motor TVCM. The third rotation element N3 is fixedly connected to the transmission housing through the second connecting member CN2, always acting as a fixed element.

The torque multiplication device 40 multiplies a torque received from the torque vectoring control motor TVCM through the second rotation element N2, and outputs the multiplied torque to the sixth rotation element N6 of the torque vectoring apparatus 30 through the first rotation element N1.

The second rotation element N2 fixedly connected to an input gear IG The input gear IG is connected to the output gear OG on the motor shaft of the torque vectoring control motor TVCM through the torque transmission member TC.

The torque transmission member TC may be formed as a chain or a belt such as a metal belt or a pulley belt.

Each of the six connecting members CN1 to CN6 may be a rotation member which is fixedly connected to a rotation element of the planetary gear sets PG1, PG2, and PG3, or may be a rotation member that selectively interconnects a rotation element to the transmission housing H, or may be a fixed member fixed to the transmission housing H.

In an exemplary embodiment of the present invention, when two or more members are described to be "fixedly connected", where each of the members may be any of a connecting member, left-side and right-side output shafts OS1 and OS2, a rotation member, and a transmission housing, it means that the fixedly connected members always rotate at a same speed.

Figure 2A:
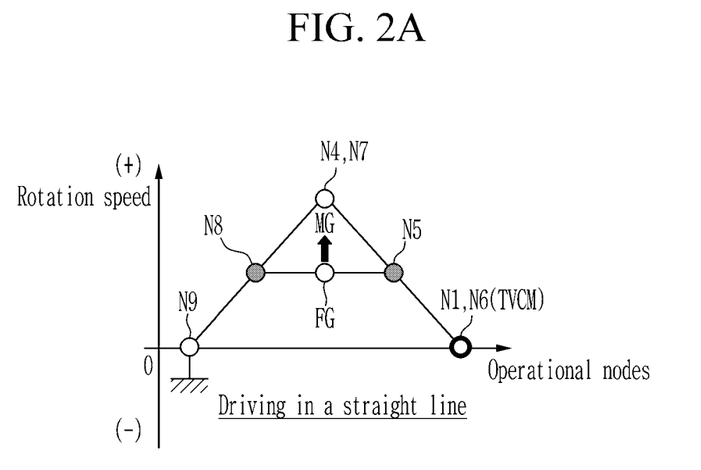
FIG. 2A, FIG. 2B, and FIG. 2C are lever diagrams illustrating torque vectoring operation of the torque vectoring apparatus according to the exemplary embodiment of the present invention.
Figure 2B:
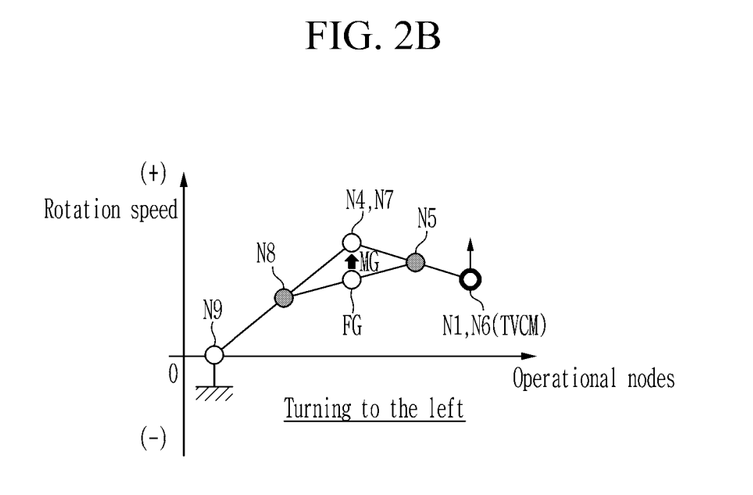
Figure 2C:
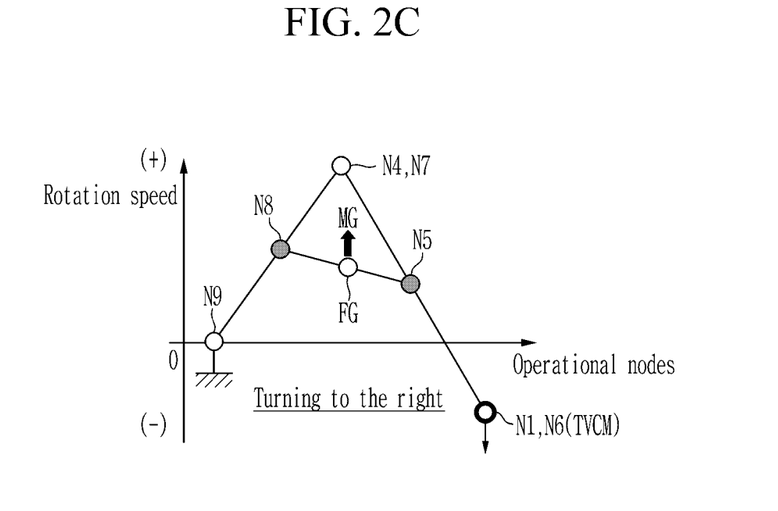

Such a schemed torque vectoring apparatus 30 realizes a torque vectoring are configured to torques transmitted to the left-side and right-side drive wheels as shown in FIG. 2, depending on rotation speed and rotation direction of the torque vectoring control motor TVCM.

FIG. 2A, FIG. 2B, and FIG. 2C are lever diagrams illustrating torque vectoring operation of the torque vectoring apparatus according to the exemplary embodiment of the present invention.

Referring to FIG. 2A to FIG. 2C, a torque vectoring apparatus according to an exemplary embodiment of the present invention adjusts a torque distribution ratio between the left-side and right-side output shafts OS1 and OS2 by controlling rotation speed and direction of the torque vectoring control motor TVCM, depending on a driving condition such as driving along a straight line, or cornering to the left or right.

In FIG. 2A to FIG. 2C, the vertical axis represents rotation speeds of the six rotation elements N4 to N9 of the second and third planetary gear set PG2 and PG3 in the differential device 20. The horizontal axis represents operational nodes of the torque vectoring apparatus.

Operation of the torque vectoring apparatus depending on driving conditions is hereinafter described in detail with reference to FIG. 2.

The fourth rotation element N4 is fixedly connected to the seventh rotation element N7. The fifth rotation element N5 is fixedly connected to the right-side output shaft OS2. The sixth rotation element N6 is fixedly connected to the first rotation element N1, and thereby the rotation speed and direction of the sixth rotation element N6 are controlled by the torque vectoring control motor TVCM.

The eighth rotation element N8 is fixedly connected to the left-side output shaft OS1. The ninth rotation element N9 is fixed to the transmission housing H. The fifth and eighth rotation elements N5 and N8 are fixedly connected to the first and second side gears SG1 and SG2 of the differential DIFF and receive reduced speeds of the motor-generator MG through the speed reduction device 10.

[Driving in a Straight Line]

As shown in FIG. 2A, driving in a straight line of the vehicle is realized while the torque vectoring control motor TVCM is stationary, i.e., rotating in a zero speed.

Since the rotation element N9 is stationary, a speed line between the ninth and seventh rotation elements N9 and N7 is formed as shown in FIG. 2A, when the seventh rotation element N7 receives a rotation speed from the motor-generator MG.

In the present situation, the torque vectoring control motor TVCM is also stationary when driving in a straight line. Therefore, a speed line between the sixth and fourth rotation elements N6 and N4 is formed as shown in FIG. 2A, since the sixth rotation element N6 is also stationary.

Since gear ratios of the second and third compound planetary gear sets PG2 and PG3 are symmetrically formed, the eighth and fifth rotation elements N8 and N5 are formed at a same height (a same rotation speed) in the graph.

Thus, in a straight line, a same torque is applied to the left-side and right-side output shafts OS1 and OS2.

[Cornering to the Left]

As shown in FIG. 2B, cornering to the right of the vehicle is realized while the torque vectoring control motor TVCM rotates in a positive (+) direction thereof.

Since the torque vectoring control motor TVCM rotates in a positive (+) direction thereof, the first and sixth rotation element N1 and N6 also have a positive rotation speed, and therefore the speed line between the sixth and fourth rotation elements N6 and N4 is formed as shown in FIG. 2B.

Consequently, the speed of the fifth rotation element N5 is increased, since the sixth rotation element N6 has a positive rotation speed.

Therefore, the speed of the fifth rotation element N5 becomes greater than the speed of the eighth rotation element N8, which means that a travel speed of the right-side drive wheel is greater than a travel speed of the left-side drive wheel.

It may be understood that a travel speed of an external wheel of a vehicle in a corner becomes greater than a travel speed of an internal wheel of a vehicle. Therefore, a wheel connected to the right-side output shaft OS2 fixed to the fifth rotation elements N5 becomes an external wheel of a corner, which means that a vehicle turns to the left.

It is notable that, while turning to the left, the torque vectoring control motor TVCM may be controlled to provide a torque adjusted in the positive direction to enhance cornering agility of a vehicle, which is advantageous in an understeer situation, or may be control to provide a torque adjusted in the negative direction to enhance stability of a vehicle, which is advantageous in an oversteer situation.

That is, a torque vectoring apparatus according to an exemplary embodiment of the present invention may achieve best optimization of cornering agility and stability depending on driving status.

[Cornering to the Right]

As shown in FIG. 2C, cornering to the left of the vehicle is realized while the torque vectoring control motor TVCM rotates in a negative (−) direction thereof.

Since the torque vectoring control motor TVCM rotates in a negative (−) direction thereof, the first and sixth rotation element N1 and N6 also have a negative rotation speed, and therefore the speed line between the sixth and fourth rotation elements N6 and N4 is formed as shown in FIG. 2B.

Consequently, the speed of the fifth rotation element N5 is decreased, since the sixth rotation element N6 has a negative rotation speed.

Therefore, the speed of the fifth rotation element N5 becomes smaller than the speed of the eighth rotation element N8, which means that a travel speed of the right-side drive wheel is smaller than a travel speed of the left-side drive wheel.

It may be understood that a travel speed of an external wheel of a vehicle in a corner becomes greater than a travel speed of an internal wheel of a vehicle. Therefore, a wheel connected to the right-side output shaft OS2 fixed to the fifth rotation elements N5 becomes an internal wheel of a corner, which means that a vehicle turns to the right.

It is notable that, while turning to the right, the torque vectoring control motor TVCM may be controlled to provide a torque adjusted in the negative direction to enhance cornering agility of a vehicle, which is advantageous in an understeer situation, or may be control to provide a torque adjusted in the positive direction to enhance stability of a vehicle, which is advantageous in an oversteer situation.

That is, a torque vectoring apparatus according to an exemplary embodiment of the present invention may achieve best optimization of cornering agility and stability depending on driving status.

When the rotation speed of the motor-generator MG exceed an allowed limit by increasing speed of a vehicle, the synchronizer SL of the speed reduction device 10 may be operated to disconnect torque transmission from and to the motor-generator MG and thereby a vehicle may be driven without a load to the motor-generator MG.

As described above, a torque vectoring apparatus according to an exemplary embodiment of the present invention is applicable to a high performance environmental vehicle provided with a one-motor e-AWD (all-wheel drive), and may achieve both cornering performance and stability of a vehicle depending on driving conditions.

Furthermore, when a vehicle speed becomes excessive to the motor-generator MG torque transmission from and to the motor-generator MG may be disconnected, reducing undesired power loss and improving fuel consumption.

Such a torque disconnection function may be applicable to a hybrid electric vehicle (HEV), a plug-in hybrid electric vehicle (PHEV), and may be useful in disconnecting torque of a drive motor in the case of running an internal combustion engine.

Fuel consumption loss in driving along a straight line may be minimized, since one ring gear R3 of the two planetary gear sets PG2 and PG3 of the torque vectoring apparatus 30 always acts as a fixed element, and the differential DIFF is mounted between the two planetary gear sets PG2 and PG3.

Since a control torque of the torque vectoring control motor TVCM is multiplied by use of a planetary gear set PG1, power loss in driving the torque vectoring control motor TVCM is minimized, improving fuel consumption characteristic.

By symmetrically forming the second planetary gear set and the third planetary gear set PG2 and PG3 in the torque vectoring apparatus, power loss of a torque vectoring apparatus may be minimized and controllability of the torque vectoring apparatus is maximized, since the torque vectoring control motor TVCM may be merely stationary in a straight line.

While the present invention has been described in connection with what is presently considered to be practical exemplary embodiments of the present invention, it is to be understood that the present invention is not limited to the included exemplary embodiments. On the other hand, it is directed to cover various modifications and equivalent claims as well as various alternatives and modifications thereof. It is intended that the scope of the present invention be defined by the Claims appended hereto and their equivalents."

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A torque vectoring apparatus receiving a vehicle driving torque from a motor-generator, the torque vectoring apparatus comprising:
    a speed reduction device engaged to the motor-generator and configured to reduce a rotation speed received from the motor-generator;
    a differential device engaged to the speed reduction device and configured to receive a speed-reduced torque from the speed reduction device and to differentially output split torques to a first output shaft and a second output shaft;
    a vectoring control motor outputting a control torque; and
    a torque vectoring apparatus engaged to the vectoring control motor and including two planetary gear sets, wherein the torque vectoring apparatus is configured to control a torque ratio of the split torques output to the first output shaft and the second output shaft by the control torque,
    wherein the differential device includes a differential case receiving a torque from the speed reduction device,
    wherein the differential case is mounted between the two planetary gear sets rotatably on a connecting member connecting the two planetary gear sets, and
    wherein side gears at a first side and a second side in the differential case are fixedly connected to the two planetary gear sets respectively.

2. The torque vectoring apparatus of claim 1, further including
    a torque multiplication device including a first planetary gear set having a first rotation element, a second rotation element, and a third rotation element and being mounted on the first output shaft between the torque vectoring apparatus and the torque vectoring control motor, the second rotation element being engaged to the torque vectoring control motor, and the third rotation element being fixedly connected to a transmission housing,
    wherein the torque multiplication device is configured to multiply a torque received from the torque vectoring control motor and to output a multiplied torque to the torque vectoring apparatus through the first rotation element.

3. The torque vectoring apparatus of claim 1, wherein the first planetary gear set is a single pinion planetary gear set including a first sun gear, a first planet carrier, and a first ring gear as the first rotation element, the second rotation element and the third rotation element, respectively.

4. The torque vectoring apparatus of claim 2, wherein the two planetary gear sets of the torque vectoring apparatus includes:
    a second planetary gear set having a fourth rotation element, a fifth rotation element, and a sixth rotation element, the fifth rotation element being fixedly connected to a first side gear of the side gears in the differential device and the first output shaft, and the sixth rotation element being fixedly connected to the first rotation element of the torque multiplication device; and
    a third planetary gear set having a seventh rotation element, an eighth rotation element, and a ninth rotation element, the seventh rotation element being fixedly connected to the fourth rotation element through the connecting member penetrating the differential case, the eighth rotation element being fixedly connected to a second side gear of the side gears in the differential device and the second output shaft of the differential device, and the ninth rotation element being fixedly connected to the transmission housing.

5. The torque vectoring apparatus of claim 4,
    wherein the second planetary gear set is a single pinion planetary gear set including a second sun gear, a second planet carrier, and a second ring gear as the fourth rotation element, the fifth rotation element, and the sixth rotation element, respectively; and
    wherein the third planetary gear set is a single pinion planetary gear set including a third sun gear, a third planet carrier, and a third ring gear as the seventh rotation element, the eighth rotation element, and the ninth rotation element, respectively.

6. The torque vectoring apparatus of claim 4, wherein the differential device includes:
    the differential case mounted between the second planetary gear set and the third planetary gear set rotatably on the connecting member fixedly connecting the fourth rotation element and the seventh rotation element;
    a plurality of differential gears rotatably mounted on internal surfaces of the differential case;
    the first side gear and the second side gear mounted at the first side and the second side, respectively, in the differential case, rotatably mounted on the connecting member to be engaged with the plurality of differential gears, and fixedly connected to the fifth rotation element and the eighth rotation element, respectively; and
    a final gear formed on an external circumference of the differential case and connected to the speed reduction device through a torque transmission member.

7. The torque vectoring apparatus of claim 6, wherein the torque transmission member includes a chain or a belt.

8. The torque vectoring apparatus of claim 2, wherein the torque vectoring control motor is connected to an output gear which is engaged, through a torque transmission member, to an input gear connected to the second rotation element.

9. The torque vectoring apparatus of claim 8, wherein the torque transmission member includes a chain or a belt.

10. The torque vectoring apparatus of claim 1, wherein the torque vectoring control motor is formed as a motor of which a rotation speed and a rotation direction is configured to be controlled.

11. The torque vectoring apparatus of claim 6, wherein the speed reduction device includes:
   a drive gear connected to a rotor of the motor-generator through a hub; and
   an idle gear unit mounted between the drive gear and the differential device to deliver a speed-reduced torque of the motor-generator to the differential device.

12. The torque vectoring apparatus of claim 11, wherein the idle gear unit includes:
   an idle shaft positioned outside of the differential device and in parallel with an axis of the first output shaft and the second output shaft;
   an idle input gear rotatably mounted on the idle shaft and gear-engaged with the drive gear; and
   an idle output gear fixedly mounted on the idle shaft and engaged to the final gear.

13. The torque vectoring apparatus of claim 12, wherein the idle output gear is engaged to the final gear via a chain or a belt.

14. The torque vectoring apparatus of claim 11, wherein the idle gear unit further includes:
   a synchronizer mounted between the idle input gear and the idle shaft and configure to selectively synchronize the idle input gear and the idle shaft.

* * * * *